US 6,675,012 B2

(12) United States Patent
Gray

(10) Patent No.: US 6,675,012 B2
(45) Date of Patent: Jan. 6, 2004

(54) APPARATUS, AND ASSOCIATED METHOD, FOR REPORTING A MEASUREMENT SUMMARY IN A RADIO COMMUNICATION SYSTEM

(75) Inventor: Steven D. Gray, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 69 days.

(21) Appl. No.: 09/944,420

(22) Filed: Aug. 31, 2001

(65) Prior Publication Data

US 2002/0160769 A1 Oct. 31, 2002

Related U.S. Application Data

(60) Provisional application No. 60/274,175, filed on Mar. 8, 2001.

(51) Int. Cl.[7] .............................. H04Q 7/20; H04Q 7/38
(52) U.S. Cl. .................... 455/423; 455/426.1; 455/424; 455/425; 455/67.1; 455/422.1; 370/338; 370/351
(58) Field of Search ................................ 455/426, 403, 455/67.1, 423, 425, 432, 466, 67.3, 550, 552, 422, 517, 424, 450, 451, 452; 370/338, 351

(56) References Cited

U.S. PATENT DOCUMENTS

| 6,377,608 | B1 | * | 4/2002 | Zyren ......................... 455/403 |
| 6,434,132 | B1 | * | 8/2002 | Ishii et al. .................. 370/338 |
| 2001/0014088 | A1 | * | 8/2001 | Johnson et al. ............. 370/338 |
| 2001/0024953 | A1 | * | 9/2001 | Balogh ........................ 455/432 |
| 2002/0060995 | A1 | * | 5/2002 | Cervello et al. ............ 370/338 |

* cited by examiner

Primary Examiner—William Trost
Assistant Examiner—Keith Ferguson
(74) Attorney, Agent, or Firm—Frederico Fraccaroli

(57) ABSTRACT

Apparatus, and an associated method, for generating a message summary field. The message summary field indicates whether 802.11-formatted data packets are communicated upon a frequency range to which a mobile station operable in an IEEE 802.11 radio communication system is tuned. An indicator indicates whether an 802.11 data packet is detected. And, a reporter generates a measurement summary which includes a measurement summary field populated with a value indicating the determination. Subsequent analysis of the value of the field of the measurement summary is utilized pursuant to dynamic frequency selection operations.

18 Claims, 4 Drawing Sheets

FIG. 2

| Bits: 1 | 1 | 1 | 1 | 1 | 1 | 1 | 1 |
|---|---|---|---|---|---|---|---|
| BSS | QBSS | To DS | From DS | Foreign PLCP Header | Periodicity | Extended CCA Report | Extended BSS Report |
| 74 | 76 | 78 | 82 | 72 | 84 | 86 | 88 |

| Frame Control | Duration | DA | SA | BSSID | Sequence Control | RSSI | CCA true MAC foreign yes or no | FCS |
|---|---|---|---|---|---|---|---|---|
| 501 | 503 | 505 | 507 | 509 | 511 | 513 | 515 | 517 | ns
APPARATUS, AND ASSOCIATED METHOD, FOR REPORTING A MEASUREMENT SUMMARY IN A RADIO COMMUNICATION SYSTEM

CROSS-REFERENCE TO RELATED APPLICATIONS

The present invention claims the priority of Application Ser. No. 60/274,175, filed on Mar. 8, 2001.

The present invention relates generally to communications by a communication station in a radio communication system operable pursuant to a first communication standard, such as the IEEE 802.11 standard, in which the frequency band available for use by the system is also utilizable by another radio communication system, operable pursuant to another communication standard. More particularly, the present invention relates to apparatus, and an associated method, by which to identify, at least in a measurement summary, whether communication activity pursuant to the first communication standard is ongoing at a portion of the frequency band to which the communication station is tuned. When implemented in a communication station operable pursuant to the IEEE 802.11 standard in the 5 GHz frequency band, a measurement summary field is formed that indicates whether the communication station is tuned to a portion of the frequency band upon which 802.11-formatted data is communicated. By identifying whether the communication station is tuned to a portion of the frequency band upon which the 802.11-formatted data is communicated, subsequent retuning or communication operations at the portion of the frequency band to which the communication station is tuned is effectuated.

BACKGROUND OF THE INVENTION

Advancements in communication technologies have permitted the introduction, and popularization, of new types of communication systems. In various of such new types of communication systems, the rate of data transmission and the corresponding amount of data permitted to be communicated, has increased relative to existing types of communication systems.

New types of radio communication systems are exemplary of communication systems that have been made possible as a result of advancements in communication technologies. Communication channels of a radio communication system are formed upon radio-links, thereby obviating the need for conventional wire-line connections between sending and receiving stations operable therein. A radio communication system, therefore, inherently permits increased communication mobility in contrast to conventional wire-line systems.

Bandwidth limitations sometimes limit the communication capacity of the communication system. That is to say, the bandwidth capacity of the communication channel, or channels, available to a communication system to communicate information between sending and receiving stations is sometimes limited. And, the limited capacity of the communication channel, or channels, limits increase of the communication capacity of the communication system. The communication capacity of the radio communication system is particularly susceptible to capacity limitation resulting from communication channel bandwidth limitations. Generally, a radio communication system is allocated a limited portion of the electromagnetic spectrum upon which to define communication channels. Communication capacity increase of a radio communication system is, therefore, sometimes limited by such allocation. Increase of the communication capacity of the radio communication system, therefore, is sometimes only possible if the efficiency by which the allocated spectrum is used is increased.

Digital communication techniques provide a manner by which the bandwidth efficiency of communications in the communication system may be increased. Because of the particular need in a radio communication system to efficiently utilize the spectrum allocated in such a system, the use of digital communication techniques is particularly advantageously implemented therein.

When digital communication techniques are used, information that is to be communicated is digitized. In one technique, the digitized information is formatted into packets, and the packets are communicated to effectuate the communication. Individual ones, or groups, of the packets of data can be communicated at discrete intervals, and, once communicated, can be concatenated together to recreate the informational content contained therein.

Because packets of data can be communicated at the discrete intervals, a communication channel need not be dedicated solely for the communication of packet data generated by one sending station for communication to one receiving station, in contrast to conventional requirements of circuit-switched communications. Instead, a single channel can be shared amongst a plurality of different sending and receiving station-pairs. Because a single channel can be utilized to effectuate communications by the plurality of pairs of communication stations, improved communication capacity is possible. Packet data communications are effectuated, for instance, in conventional LANs (local area networks). Wireless networks, operable in manners analogous to wired LANs have also been developed and are utilized to communicate packets of data over a radio link, thereby to effectuate communications between a sending station and a receiving station connected by way of the radio link.

For example, an IEEE (Institute of Electrical and Electronic Engineers) 802.11 standard defines a system for operation of a wireless LAN. The system is defined in terms of logical layer levels, and operational parameters of the various layers of the system are defined in the standard.

Proposals have been set forth to utilize an unlicensed band located at 5 GHz and to implement a WLAN operable generally pursuant to the IEEE 802.11 standard.

Other systems are also implementable at the 5 GHz frequency band. A radio communication system, referred to as the HyperLan II system is, for instance, also implemented at the 5 GHz band. The HyperLan II system is operable pursuant to a standard promulgated by the ETSI. The HyperLan II system also is a WLAN system.

As more than one communication system is operable upon common frequency portions of the 5 GHz band, communication systems operable therein must be able to dynamically select the frequency band portions upon which communications are effectuated. Dynamic selection is required so that more than one communication system does not concurrently use the same frequencies to attempt to effectuate communications.

The European Regulatory Commission (ERC) has set forth system requirements of systems operable in the 5 GHz frequency band. For instance, amongst the requirements include a requirement that a system operable at the 5 GHz band generate electromagnetic energy emissions which are spread over available frequency channels defined therein. That is, the interference level formed of the communication signal energy generated during operation of the communication system must be approximately constant over a large bandwidth of the frequency band. The interference must be spread equally and must avoid interfering with communications in satellite and radar systems.

And, for instance, an IEEE802.11 or HyperLAN system requires that a mobile station (STA) be capable of tuning to a frequency portion of the frequency band not currently used by a basic service set (BSS). And, once tuned thereto, the mobile station is required to measure for the presence of interference. Once the measurement is made, a report of the measurement must be returned to an access point (AP) of the basic service set. This procedure is referred to as dynamic frequency selection (DFS), as a result of analysis of the measurements, an access point of the basic service set determines whether to select a new frequency range for operation of the mobile station. This procedure is referred to as dynamic frequency selection (DFS). In a HyperLan II system, mobile stations report indications of a received signal strength indication (RSSI) block in a base band transceiver system as part of a DSF mechanism. Use of an RSSI indication, however, fails to provide an indication as to the source of interfering signals.

A manner better able to facilitate dynamic frequency selection in a mobile station operable in an IEEE 802.11 system would be advantageous.

It is in light of this background information related to operation of a radio communication system in which dynamic frequency allocation is utilized that the significant improvements of the present invention have evolved.

SUMMARY OF THE INVENTION

The present invention, accordingly, advantageously provides apparatus, and an associated method, for use in a radio communication system operable pursuant to a first communication standard, such as the IEEE 802.11 standard, in which the frequency band available for use by the system is also utilizable by another communication system operable pursuant to another communication system standard.

Through operation of an embodiment of the present invention, a manner is provided by which to identify, at least in a measurement summary, whether communication activity pursuant to the first communication standard is ongoing upon a portion of the frequency band to which the communication station is tuned. By providing the measurement summary, decisions are better able to be made regarding subsequent retuning or subsequent communication operations of the communication station. And, thereby dynamic frequency selection is facilitated.

In one aspect of the present invention, a measurement summary field is formed by a mobile station (STA) operable pursuant, generally, to the IEEE 802.11 standard in the 5 GHz frequency band. The measurement summary field is of a value that indicates whether the mobile station is tuned to a portion of the frequency band upon which 802.11-data is communicated. By communicating the measurement summary field to a control device, such as an access point (AP) operable in the 802.11 system, decisions are made regarding whether to retune the mobile station or to commence communications upon the portion of the frequency band at which the mobile station is tuned.

In another aspect of the present invention, the measurement summary field is populated with a value to indicate whether the mobile station is tuned to a frequency range upon which 802.11 data packets are communicated. If 802.11 data packets are communicated at the frequency range to which the mobile station is tuned, the measurement summary field is populated with a first value. If, conversely, 802.11 data packets are not communicated at the frequency range to which the mobile station is tuned, the measurement summary field is of another value. A measurement summary including the measurement summary field is communicated by the mobile station to an access point at which control functions are performed to control subsequent operation of the mobile station.

In another aspect of the present invention, once the mobile station is tuned to a selected frequency range, measurement is made of communication energy communicated at the frequency range. If communication energy is detected, the communication energy is decoded to detect whether the communication energy forms packet-formatted data. If packet formatted data is detected, further analysis of a data packet is made to determine whether the data packet is an 802.11-formatted data packet. Upon such detection, the measurement summary field is populated with a value indicating the frequency range to which the mobile station is tuned to have 802.11-formatted data packets communicated thereon. Otherwise, an indication is populated in the measurement summary field to indicate that 802.11-formatted data is not communicated upon the frequency range to which the mobile station is tuned.

In another aspect of the present invention, upon detection of the communication energy, and decoding thereof to detect the presence of a data packet, further analysis is made to identify whether the data packet is an 802.11-formatted data packet or, relative to the 802.11 standard, a foreign PLCP (physical layer convergence protocol)-formatted packet. Determination of the data packet-type is made through analysis of the packet at the physical layer and logical layer above the physical layer by which the communication system in which the mobile station is operable. In an 802.11 system, a valid packet is determined by proper decoding of the signal field, cyclic redundancy check (CRD) on the physical layer protocol data units (PPDU) and valid MAC address format. In contrast, a HyperLan II data packet does not have a corresponding 802.11-formatted data structure. Thereby, differentiation between a HyperLan II-formatted data packet and an 802.11-formatted data packet is made.

In one implementation, apparatus, and method, is provided for a mobile station operable in an IEEE 802.11 WLAN. The mobile station tunes to a frequency range within the 5 GHz frequency band. Once tuned to the frequency range, a CCA (clear channel assessment) operation is performed. A determination is made whether the CCA indicates the frequency range to be busy. The determination is made by detecting whether communication energy is present on the frequencies to which the mobile station is tuned. If communication energy is detected to be present, the mobile station further determines whether the communication energy forms a data packet which is formatted pursuant to the IEEE 802.11 standard. To make this determination, decoding operations are performed to detect a preamble portion of a data packet. If a preamble portion of a data packet is detected, further decoding operations are performed upon a signal field portion of the data packet. Subsequent to such decoding, further inquiry of the data packet is made to check to where the data packet is addressed. If a MAC ID (identifier) is detected, then the data packet is a 802.11-formatted data packet. As a HyperLan II-formatted data packet does not have a corresponding 802.11 formatted signal field (i.e., PLCP header) and MAC identifier, operation of an embodiment of the present invention is able to distinguish between a HyperLan II-formatted data packet and an 802.11-formatted data packet.

In these and other aspects, therefore, apparatus, and an associated method, is provided for a first radio communication system in which a selected portion of a frequency band is dynamically selectable upon which to communicate a first-system-type data packet. The frequency band is also selectably utilized by a second radio communication system upon which selectably to communicate a second-system-type data packet. Reporting upon whether the portion of the frequency band to which a communication station is tuned is being used to communicate the first-system-type data packet is performed. An indicator is at least coupled to receive an indication of a determination of whether the first-system-type data packet is communicated upon the portion of the frequency band to which the communication station is tuned. The indicator generates an indication signal representative of the determination. A reporter is coupled to receive the indication signal generated by the indicator. The reporter generates a report message that includes a field populated with a value indicative of the indication signal generated by the indicator.

A more complete appreciation of the present invention and the scope thereof can be obtained from the accompanying drawings which are briefly summarized below, the detailed description of the presently preferred embodiments of the invention, and the appended claims.

BRIEF DESCRIPTION OF THE DRAWINGS

FIG. 2 illustrates an exemplary format of a measurement summary frame generated during operation of an embodiment of the present invention.

FIG. 7 illustrates a frame used to send measurement data to an AP.

DETAILED DESCRIPTION

Figure 1:
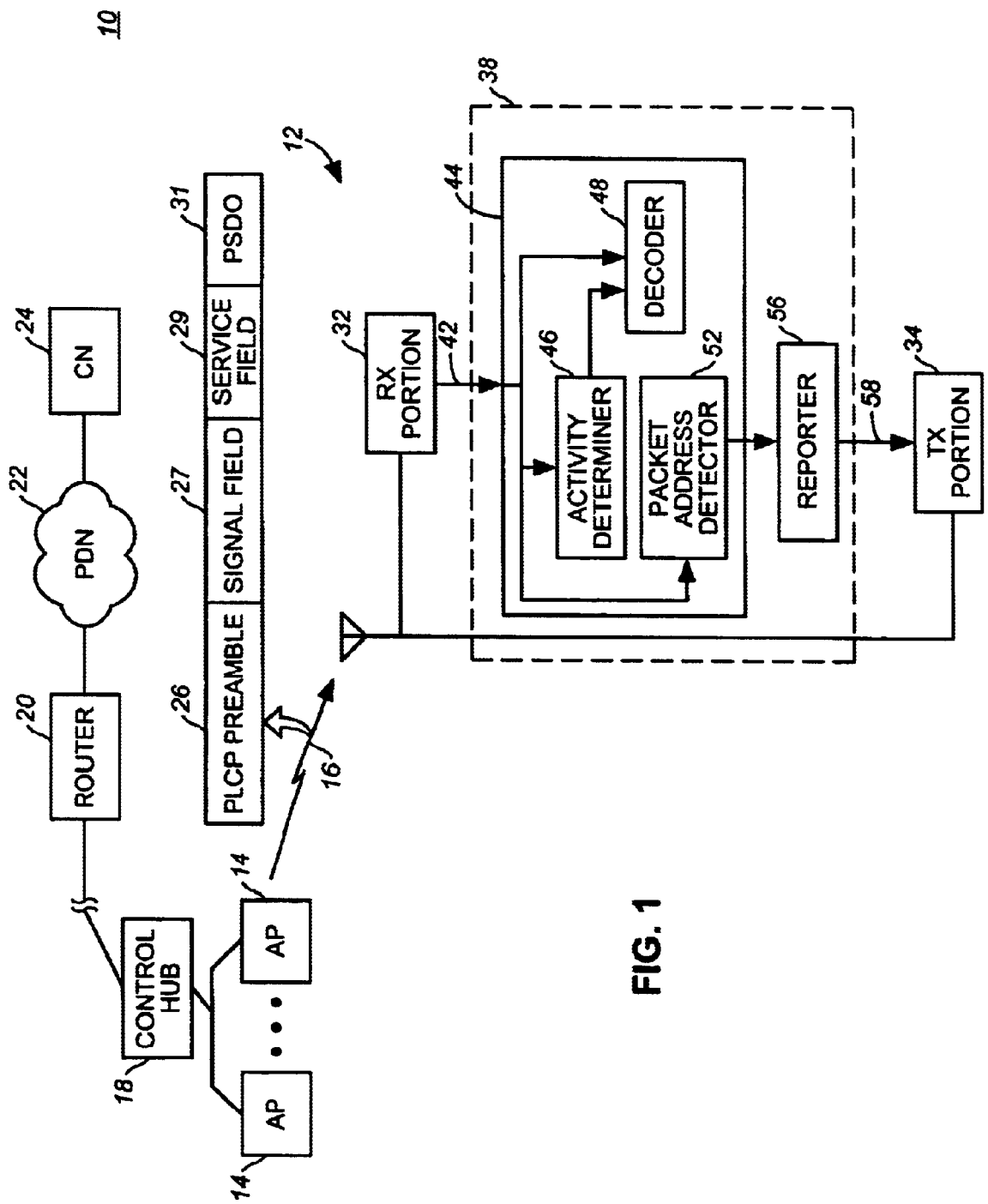
FIG. 1 illustrates a functional block diagram of a communication system in which an embodiment of the present invention is operable.

Referring first to FIG. 1, a communication system, shown generally at 10, is operable to provide packet radio communications with a mobile station (STA) 12.

In the exemplary implementation, the communication system includes a WLAN (wireless local area network) constructed generally to be operable pursuant to the IEEE (Institute of Electrical and Electronic Engineers) 802.11 standard at the 5 GHz frequency band. The mobile station 12 is here operable, generally, pursuant to the IEEE 802.11 standard. The communication system is exemplary. While operation of an embodiment of the present invention shall be described with respect to implementation of the communication system 10 as an IEEE 802.11 system, the teachings of the present invention are analogously applicable in other types of communication systems.

During operation of the communication system, data is communicated from, and to, the mobile station with a selected access point (AP), here an access point 14, of a plurality of access points, of which two access points are shown in the Figure. The data is communicated by way of radio links 16 formed between the mobile station 12 and the selected access point. Data communicated by the mobile station to the access point is sometimes referred to as being communicated on a reverse link channel, and data communicated by the access point 14 to the mobile station upon the radio link 16 is sometimes referred to as being communicated upon a forward link channel.

When data is communicated, upon either of the forward or reverse link channels, the data is communicated in the form of electromagnetic energy, here referred to as communication energy. In the 5 GHz frequency band, prescribed channel allocations are not specifically allocated to a particular communication system. That is to say, the IEEE 802.11 system forming the communication system 10 is not specifically allocated a portion of the frequency band for its exclusive use. Instead, other systems are also permitted to be implemented and operated at the same frequency regions of the frequency bands. To prevent concurrent usage of the same frequency regions of the frequency band, dynamic frequency selection (DFS) schemes must be utilized by devices operable in communication systems which utilize the 5 GHz frequency band.

Generally, in a dynamic frequency selection scheme, portions of the frequency band are dynamically selected for use upon determination that the frequency band regions are not being utilized for other communications by another communication system. If a frequency range is determined already to be in use, an alternate frequency range is selected upon which to effectuate communications. By providing the dynamic frequency selection, the same frequency ranges are not attempted to be used concurrently by two, or more, separate communication systems.

As noted above, a communication system includes a plurality of access points, of which two access points 14 are shown in the figures. Each of the access points defines a coverage area, sometimes referred to as a cell. When a mobile station is positioned within a cell, communications of the mobile station with the infrastructure part of the communication system is generally effectuated with the access point which defines the cell within which the mobile station is positioned.

The access points 14 are connected to a control hub 16. The control hub is operable to control operation of the access points and communications in the WLAN. The control hub, sometimes embodied at a computer server, is connected to a router that, in turn, is coupled to a packet data network (PDN) 24. The packet data network is formed of, for instance, the internet backbone. And, a correspondent node (CN) 26 is coupled to the packet data network. The correspondent node is representative of any communication device that is capable of communicating packet data by way of the packet data network and, by way of a communication path formable with the mobile station 12.

The figure further illustrates the frame structure of an IEEE 802.11-formatted packet. A PLCP Preamble field 26 includes OFDM training symbols. The training symbols also trigger the CCA mechanism. The PLCP Preambles of IEEE 802.11-formatted and HyperLAN II-formatted packets are nearly identical. The frame structure also includes a signal field 27. The signal field conveys modulation used in the PSDU field (described below). The service field 29 includes scrambler initialization bits for data. The PSDU field 31 forms a Physical Layer Service Data Unit field identifying where the transmitted data goes. While not separately shown, a PLCP header can be used that is a combination of the signal field and the service field.

The mobile station 12 includes a receive portion 32 operable to detect, and act upon, data communicated to the mobile station by way of a forward link channel of the radio link 16. And, the mobile station includes a transmit portion 34 operable to operate upon data to be communicated upon a reverse link channel of the radio link 16 to the access point.

The mobile station also includes apparatus 38 of an embodiment of the present invention. The apparatus is operable, pursuant to dynamic frequency selection operations of the mobile station and network portion parts of the communication system, to permit communication operations to be performed by the mobile station at a frequency range to which the mobile station is tuned or, alternately, to instruct the mobile station to tune to another frequency range. The apparatus is coupled to both the receiving and transmit portions of the mobile station.

The elements of the apparatus 38 are functionally represented. Implementation of the elements of the apparatus is made any desired manner. In the exemplary implementation, the elements form, at least in part, algorithms executable by suitable processing circuitry. Once the mobile station is tuned to a selected frequency range, circuitry of the receive portion detects communication energy on the forward link channels of the radio link within the frequency range to which the mobile station is tuned. Indications of the detected communication energy, or lack thereof, are provided by way of the line 42 to an indicator 44 of the apparatus 38.

The indicator 44 includes an activity determiner 46. The activity determiner here performs a clear channel assessment (CCA) operation. The clear channel assessment operation determines whether communication energy is present upon the frequency range to which the mobile station is tuned. The activity detector is coupled to a decoder 48. And, the decoder is also coupled by way of the line 42 to receive indications of communication energy, if any, received by the receive portion of the mobile station. The decoder is operable, upon detection of communication energy by the activity detector to attempt to decode the communication energy.

And, the indicator 44 also includes a packet address detector. The packet address detector is also coupled to the line 42 to receive indications of communication energy, if any, received at the receive portion of the mobile station. The packet address detector is operable preamble portion of a data packet which is formed at a physical (PHY) logical layer of the 802.11 communication system. The packet address detector 52 detects whether an MAC (medium access control) layer packet address is part of the received communication energy. A HyperLan-II-formatted data packet does not include 802.11 formatted signal field and MAC-layer packet address. The packet address detector thereby is able to distinguish between a HyperLan-II-formatted data packet and an 802.11-formatted data packet.

The apparatus 38 further includes a reporter 56 that is coupled to the packet address detector 52 of the indicator 44. The reporter 56 is operable to generate a measurement summary that includes a field populated with a value indicating whether the frequency range to which the mobile station is tuned contains an 802.11-formatted data packet. If another data packet-type data packet is detected, such as a HyperLan-II-formatted data packet, the field is populated with another value. The field thereby at least indicates whether a frequency range to which the mobile station is tuned is being used to communicate an 802.11-formatted data packet or a data packet formatted pursuant to a foreign PLCP (physical layer convergence protocol).

The measurement summary is provided to the transmit portion 34 by way of the line 58. The transmit portion transmits the measurement summary by way of a reverse link channel formed upon the radio link 16 back to the access point. Here, once received at the access point, indications of the measurement summary are routed to the control hub 18, or other appropriate structure. Analysis of the measurement summary is made at the control hub, and the control hub selects whether the mobile station should remain tuned to the frequency range or become retuned to another frequency range.

FIG. 2 illustrates an exemplary measurement summary, shown generally at 68, formed by the apparatus 38 of the mobile station shown in FIG. 1. The measurement summary includes a plurality of fields, including a field 72. The field 72 is a single-bit field, here identified as a foreign PLCP header field. The field is populated with a first value when a PLCP is detected upon the frequency range to which the mobile station is tuned during a measurement interval, but, if no valid signal field is subsequently detected, such as that which occurs when a HyperLan-II-formatted data packet is communicated upon a communication channel defined within the frequency range to which the mobile station is tuned. And, the field 72 is of another value when an 802.11-formatted data packet is detected.

The measurement summary 68 here also includes additional single-bit fields 74, 76, 78, 82, 84, 86, and 88. The field 74 is a BSS (basic service set) field, the value of which specifies whether at least one valid MAC header was decoded for the measured frequency channel. The field 76 is a QBSS field. The value of the field 76 specifies whether the at least one BSS is running in QBSS. The bit is set only if the mobile station is IEEE 802.11(e) MAC enabled. Fields 82 and 84 are values indicating whether the to DS field and from DS field is set during the frame during which the measurement is made by the mobile station.

The field 84 is a periodicity field. The periodicity field is of a value which specifies whether at least two consecutive CCA (clear channel assessment) measurements of busy and on off patterns are periodic. A signal is classified as periodic if at least two consecutive CCA busy duration and CCA busy intervals are identical. The field 86 is an extended CCA report field. The value of the field 86 specifies whether the CCA busy fraction, CCA busy duration, and CCA busy interval are present in the report. And, the field 88 is an extended BSS report. The value of the field 88 specifies whether the measurement report frame contains a detailed report.

Figure 3:
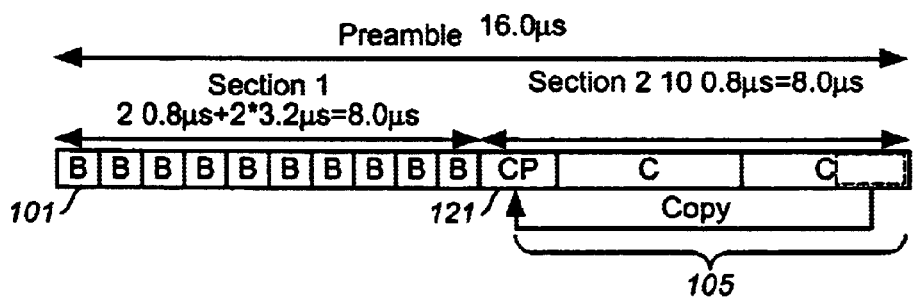
FIG. 3 illustrates the structure of a preamble portion of an IEEE 802.11-formatted data packet.

Turning next to FIG. 3, to provide a basic understanding of what Clear Channel Assessment (CCA) is, below is a description of the IEEE802.11a preamble and how the preamble is used in CCA. In addition, simulations show that a system with a Physical Layer (PHY) similar to IEEE802.11a can trigger the CCA mechanism even at very low SNRs. Thus, it is important to detect the presence of systems that use a PHY similar to IEEE802.11a, but have a different Media Access Control (MAC) and report this during a Dynamic Frequency Selection (DFS) measurement.

The preamble shown in FIG. 3 is pre-appended to all data bursts in a IEEE802.11a WLAN system where "B" represents a short training symbol of which the first short training symbol 101 is an example. The short symbols produce a waveform with a periodicity of 0.8 us. The short symbols are the first part of the packet received by the radio frequency (RF) in the orthogonal frequency division multiplexing (OFDM) demodulator; thus, the first two symbols may be distorted due to settling of the gain control loop and the associated quantization effects. However, the remaining eight short symbols provide ample energy for reliable packet detection and clear channel assessment. The key is in having sufficient averaging to reduce the effects of additive noise.

The long symbols 105 are shown in FIG. 1 as "C" where the long symbols and short symbols are separated using a cyclic prefix 121 indicated as CP. The CP 121 allows for a channel estimation of the long symbols 105 without the influence of Intersymbol Interference ISI. The long symbols 105 are 3.2 us in duration, excite all frequencies in the occupied band and provide sufficient samples for channel estimation.

The Delay Correlation Method

Figure 4:
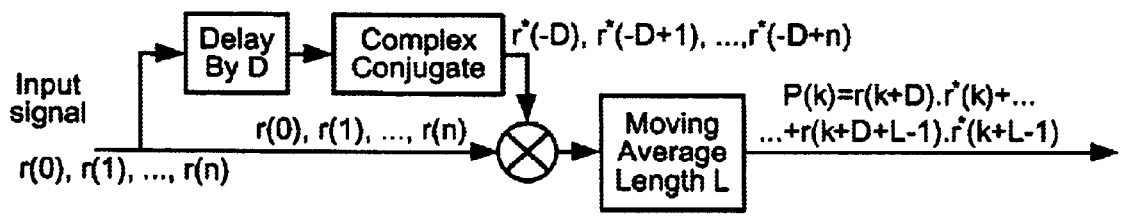
FIG. 4 illustrates a functional block diagram of a delayed signal correlator.

The principle of delay and correlate method is to correlate the received signal with a delayed version of itself. The idea is to exploit the particular structure of the preamble in order to obtain reliable estimates of start of a data burst. A block diagram of the basic structure is shown in FIG. 4. If the input signal consists of complex samples r(i), the correlator has a delay D and a moving average window size of L then the correlator output can be written:

$$P(k) = \sum_{n=0}^{L-1} r^*(k+n) \cdot r(k+n+D)$$

Considering a received signal model of $r(k)=s(k)\exp(j2\pi f_0 t)+n(k)$, then $$P(k) = \sum_{n=0}^{L-1} |s(k+n)|^2 \exp(j2\pi f_0 D) + n^*(k+n)n(k+n+D)$$

where $s(k+n+D)=s(k+n)\exp(j2\pi f_0 D)$ assuming that s(k) are samples from the short training symbols with a periodicity of modulo D. Examining P(k) from above, a maximum is achieved when k=D+L.

A critical function for the IEEE802.11 MAC carrier sense, multiple access protocol is obtaining a clear channel assessment (CCA). CCA is used by a station (STA) to determine if the channel is clear and an access attempt is possible. The IEEE802.11a WLAN specification requires that the received signal levels equal or greater to the minimum sensitivity for BPSK (−82 dBm) will cause CCA to indicate "Busy" to the MAC when a preamble is detected. The probability of detection, i.e., the probability that CCA algorithm will correctly identify a busy condition, is $P_D>90\%$ (as defined in IEEE802.11a WLAN Specification).

CCA can be considered a binary hypothesis test to determine if the medium is busy. It consists of the hypothesis $H_1$ which indicates that the channel is busy and the hypothesis $H_0$ which indicates that the channel is idle. The test statistic is defined as $$S = \sum_{k=1}^{N} |P(k)|^2 \geq Th \quad (6.1)$$

under hypothesis $H_1$, and $$S = \sum_{k=1}^{N} |P(k)|^2 < Th \quad (6.2)$$

under hypothesis $H_0$, where Th is the threshold, and N is the number of redundant measurements.

When there is no preamble, the magnitude of S decreases generally with signal to noise ratio (SNR). However, the kurtosis, defined by $$\sum_i \frac{(|P(i)|^2 - \bar{S})^4}{N(\hat{\sigma}^2)^2}$$

increases. Here $\hat{\sigma}^2$ is an estimated variance and $\bar{S}$ is the sample mean.

Simulation results are described here.

To show the output of the CCA algorithm when a either IEEE802.11a or HiperLAN II PHY is detected, simulation results are presented with the following assumptions:
 (1) Packet size: 512-bit,
 (2) Rate: R=¾, with puncturing and interleaving,
 (3) The generator polynomials for the convolutional coding: $V_1(D)=(1+D^2+D^3+D^5+D^6)$ and $V_2(D)=(1+D+D^2+D^3+D^6)$, with K=7, and $d_{free}=10$,
 (4) 64-QAM for a modulation,
 (5) Channel: 5-tap Rayleigh channel with taps {0.749, 0.502, 0.3365, 0.2256, and 0.1512}.

It should be pointed out that the choice of modulation will have no impact on CCA when the preamble is detected. 64 QAM is chosen as the modulation type when the preamble is not used in determining channel state due to the SNR range being approximately 20 dB above the minimum sensitivity for BPSK.

In the simulations, we considered two scenarios, (a) with preamble symbols, and (b) no preamble symbols.

The first scenario includes using preamble symbols: The delay factor used in the computation of the correlation outputs is 16 (i.e., distance between short symbols) and Monte-Carlo simulation methodology was used to estimate performance. FIG. 4 is the probability detection 301 and 303, $P_D$, and the false-alarm rate 321, $P_F$, where the probability detection 301 and 303 $P_D$ grows with increasing SNR. For example, the $P_{D\ for\ SNR=20}$ is shown as a first function. In addition, this figure indicates a reliable false-alarm rate, $P_F<<0.1$ at $P_D\approx0.9$.

Figure 5:
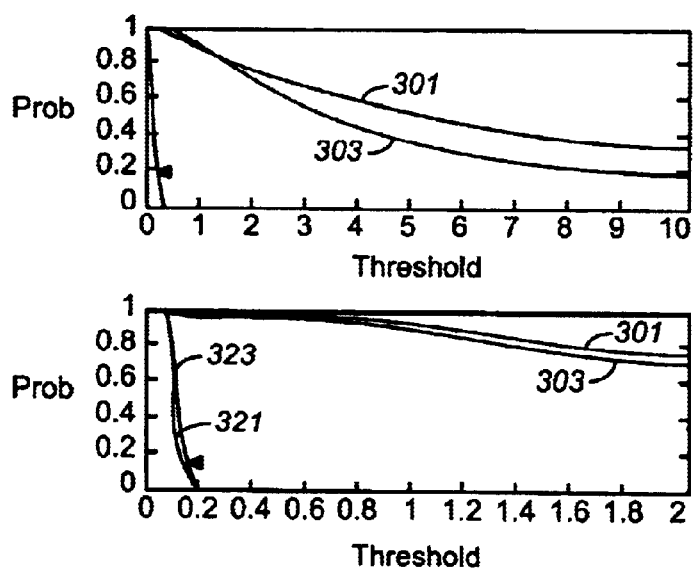
FIG. 5 illustrates an exemplary relationship between a false alarm rate and a detection probability pursuant to operation of an embodiment of the present invention.
Figure 6:
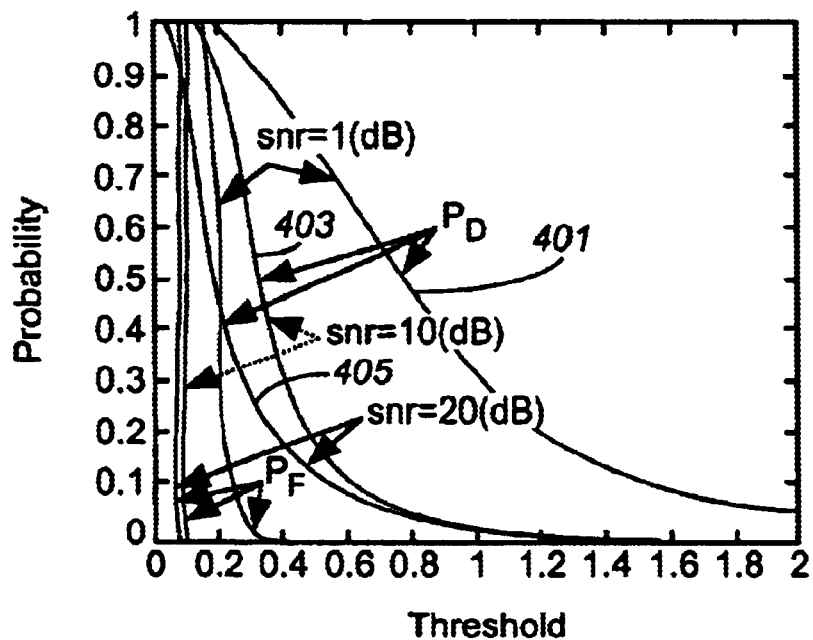
FIG. 6 illustrates a representation, similar to that shown in FIG. 5, but here with a different delay factor.

The second scenario operates without using preamble symbols: For the same simulation conditions as in the first scenario, FIG. 5 shows $P_D$ and $P_F$ for different SNRs. A delay factor of 64 is chosen due to the distance between the cylix prefix and the beginning of an OFDM symbol. FIG. 5 indicates that $P_D$ decreases generally with SNR which matches the result in FIG. 4. We can also keep $P_F<<0.1$ at $P_D\approx0.9$. As in the first scenario, the Monte-Carlo simulation technique is used to find $P_D$ 401, 403 and 405.

While CCA was designed as a means to allow Stations in an IEEE802.11a WLAN system to assess if the channel was clear for transmission, CCA can also be used when doing a DFS measurement to determine the existence of PHYs that are similar to IEEE802.11a. In fact, as the simulation results show, this can be done at SNRs approaching 0 dB. Thus, the invention proposes that the following steps be taken when performing a measurement for the purposes of DFS.
 1. The STA tunes to a desired frequency to do a measurement.

2. The STA using the energy measurement feature of the IEEE802.11a transceiver measures the received signal strength (prior art).
3. The STA examines the output of the CCA hypothesis test.
4. If CCA triggers true, the STA listens for a Beacon Frame from an IEEE802.11a WLAN system.
5. If the STA cannot identify a valid IEEE802.11 a Beacon Frame, then it determines that there is a PHY similar to IEEE802.11a, but the MAC is foreign.
6. The STA reports to the AP that a PHY similar to IEEE802.11a was found, but the MAC was foreign.

The frame used to send measurement data to the AP could be as shown in FIG. 7, which includes Frame Control (501), Duration 503, DA 505, SA 507, BSSID 509, Sequence Control 511, RSSI 513, CCA true MAC foreign yes or no 515 and FCS 517.

Table 2 shows the frequency allocation for WLAN operation in Europe and how the frequencies are allotted for HiperLAN II.

TABLE 2

| Center Frequencies (20 MHz Spacing) | Effective Radiated Power |
| --- | --- |
| 5180–5320 | 23 dBm |
| 5500–5680 | 30 dBm |
| 5700 | 23 dBm |

Figure 8:
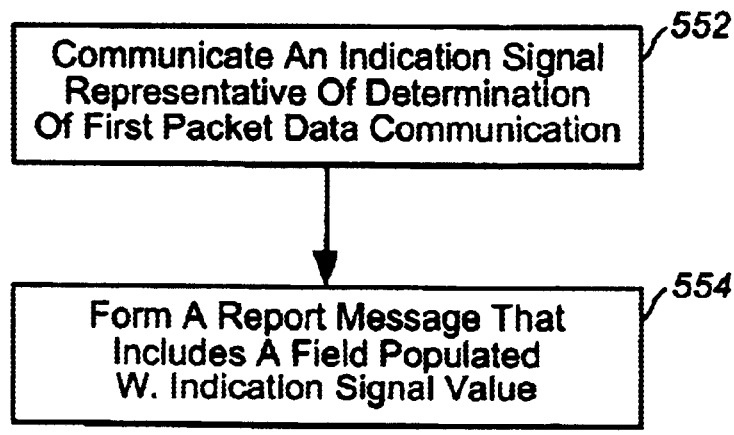
FIG. 8 illustrates a method of an embodiment of the present invention.

FIG. 8 illustrates a method, shown generally at 550, of an embodiment of the present invention. The method at least reports whether the portion of a frequency band to which a communication station is tuned is being used to communicate a first-system-type data packet. The communication station is operable in a first radio communication system in which a selected portion of a frequency band is dynamically selectable upon which to communicate a first-system-type data packet. The frequency band is also selectably utilized by a second radio communication system upon which to selectably communicate a second-system-type data packet.

First, and as indicated by the block 552, an indication signal representative of a determination of whether the first-system-data packet is communicated upon the portion of the frequency band to which the communication station is tuned is generated. Then, and as indicated by the block 554, a report message is formed. The report message includes a field populated with a value indicative of the indication signal.

Thereby, a report message is formed that indicates whether communication activity pursuant to a first radio communication system is ongoing at a portion of the frequency band to which the communication station is tuned. Upon analysis of the report message, subsequent retuning, or subsequent communication, operations are caused to be performed by the communication station.

The preferred descriptions are of the preferred examples for implementing the invention, and the scope of the invention should not necessarily be limited by this description. The scope of the present invention is defined by the following claims.

In the claims:

1. In a first radio communication system in which a selected portion of a frequency band is dynamically selectable upon which to communicate a first-system-type data packet, the frequency band also selectably utilized by a second radio communication system upon which selectably to communicate a second-system-type data packet, an improvement of apparatus for a communication station operable in the first radio communication system, said apparatus at least for reporting whether the portion of the frequency band to which the communication station is tuned is being used to communicate the first-system-type data packet, said apparatus comprising:

an indicator at least coupled to receive an inciation of a determination of whether the first-system-type data packet is communicated upon the portion of the frequency band to which the communication station is tuned, said indicator for generating an indication signal representative of the determination; and a reporter coupled to receive the indication signal generated by said indicator, said reporter for generating a report message that includes a field populated with a value indicative of the indication signal generated by said indicator.

2. The apparatus of claim 1 wherein the communication station comprises a receive portion and wherein said indicator comprises an activity determiner coupled to the receive portion; said activity determiner for determining activity upon the selected portion of the frequency band to which the communication station is tuned, said activity determiner for indicating at least when communication energy is determined to be present upon the selected portion of the frequency band.

3. The apparatus of claim 2 in which the communication system is operable pursuant to an operational protocol which defines a clear channel assessment operation and wherein said activity determiner performs a clear channel assessment operation.

4. The apparatus of claim 3 wherein said indicator further comprises a decoder coupled to said activity determiner and coupled to receive indications of the communication energy when determined to be present upon the selected portion of the frequency band, said decoder for decoding at least part of the communication energy to determine whether the communication energy comprises at least one of the first-system-type data packet and the second-system-type data packet.

5. The apparatus of claim 4 wherein the first-system-type data packet is defined in terms of logical layers including a physical (PHY) layer and at least one higher-level layer, and wherein said identifier further comprises a packet address detector operable responsive to determination by said decoder that the communication energy comprises at least one of the first-system-type and second-system-type data packets, respectively, said packet address detector for detecting whether the at least one of the first-system-type and second-system-type data packets further comprises a packet address in the higher-level layer.

6. The apparatus of claim 5 wherein the first-system-type data packet is formatted according to a selected higher-level layer protocol and wherein said packet address detector detects when the communication energy comprises the data packet formatted according to the selected higher-level layer protocol.

7. The apparatus of claim 6 wherein the first radio communication system is operable pursuant to an IEEE (Institute of Electrical and Electronic Engineers) 802.11 standard and wherein said packet detector detects when the communication energy comprises an IEEE 802.11-formatted data packet.

8. The apparatus of claim 1 wherein the field of the report message generated by said reporter is formed of a first digital value when the indication signal is of a first value and is formed of another digital value when the indication signal is other than the first value.

9. The apparatus of claim 1 wherein the first radio communication system is operable pursuant to an IEEE (Institute of Electrical and Electronic Engineers) 802.11 standard and wherein the field of the report message generated by said reporter is of a value indicative of whether an 802.11-standard-formatted data packet is determined to be communicated upon the portion of the frequency band to which the communication station is tuned.

10. The apparatus of claim 9 wherein the second-system-type data packet is formatted pursuant to a foreign, relative to the IEEE 802.11 standard, PLCP (physical layer convergence protocol) and wherein said indicator distinguishes between the 802.11-standard-formatted data packet on a foreign-PLCP-formatted data packet forming the second-system-type data packet.

11. The apparatus of claim 10 wherein said reporter generates a communication-station measurement summary and wherein the field populated with the value indicative of the indication signal generated by said indicator comprises a portion of the communication-station measurement summary.

12. In a method for communicating in a first radio communication system in which a selected portion of a frequency band is dynamically selectable upon which to communicate a first-system-type data packet, the frequency band also selectably utilized by a second radio communication system upon which selectably to communicate a second-system-type data packet, an improvement of a method for a communication station operable in the first radio communication system, said method at least for reporting whether the portion of the frequency band to which the communication station is tuned is being used to communicate the first-system-type data packet, said method comprising:

generating an indication signal representative of a determination of whether the first-system-type data packet is communicated upon the portion of the frequency band to which the communication station is tuned; and forming a report message that includes a field populated with a value indicative of the indication signal generated during said operation of generating.

13. The method of claim 12 comprising the additional operation, prior to said operation of generating, of determining activity upon the selected portion of the frequency band to which the communication station is tuned, the activity upon the selected portion of the frequency band indicated at least when communication energy is determined to be present upon the selected portion of the frequency band.

14. The method of claim 13 wherein the communication system is operable pursuant to an operational protocol which defines a clear channel assessment operation, and wherein said operation of determining comprises performing a clear channel assessment operation.

15. The method of claim 14 further comprising the operation, subsequent to said operation of performing, of decoding at least part of the communication energy, when determined during said operation of determining to be present, to determine whether the communication energy comprises at least one of the first-system-type data packet and the second-system-type data packet.

16. The method of claim 15 wherein the first-system-type data packet is defined in terms of logical layers including a PHY (physical) layer and at least one higher-level layer, and wherein said method further comprises the operation of detecting whether the at least one of the first-system-type and second-system-type data packets, respectively, further comprises a packet address in the higher-level layer.

17. The method of claim 16 wherein the first radio communication system is operable pursuant to an IEEE (Institute of Electrical and Electronic Engineers) 802.11 standard and wherein said operation of detecting comprises detecting when the communication energy comprises an IEEE 802.11-formatted data packet.

18. The method of claim 13 wherein the first radio communication system is operable pursuant to an IEEE (Institute of Electrical and Electronics Engineers) 802.11 standard and wherein the field of the report message generated during said operation of generating is of a value indicative of whether an 802.11-standard-formatted data packet is determined to be communicated upon the portion of the frequency band to which the communication station is tuned.

* * * * *